US010521760B2

(12) United States Patent
Turner et al.

(10) Patent No.: US 10,521,760 B2
(45) Date of Patent: Dec. 31, 2019

(54) AUTOMATED COLLECTION POINTS AND METHOD OF OPERATION

(71) Applicant: ByBox Holdings Ltd, Oxfordshire (GB)

(72) Inventors: Dan Turner, Oxfordshire (GB); Robin Minto, Oxfordshire (GB); Jean-Louis Barre, London (GB)

(73) Assignee: BYBOX HOLDINGS LIMITED, Oxfordshire (GB)

( * ) Notice: Subject to any disclaimer, the term of this patent is extended or adjusted under 35 U.S.C. 154(b) by 921 days.

(21) Appl. No.: 14/768,063

(22) PCT Filed: Feb. 14, 2014

(86) PCT No.: PCT/GB2014/000053
§ 371 (c)(1),
(2) Date: Aug. 14, 2015

(87) PCT Pub. No.: WO2014/125243
PCT Pub. Date: Aug. 21, 2014

(65) Prior Publication Data
US 2015/0379464 A1 Dec. 31, 2015

(30) Foreign Application Priority Data
Feb. 14, 2013 (GB) .................................. 1302620.8

(51) Int. Cl.
*G06Q 10/08* (2012.01)
(52) U.S. Cl.
CPC ................................ *G06Q 10/0836* (2013.01)
(58) Field of Classification Search
CPC ............ G06Q 10/0836; G07C 9/00571; G07C 2009/0092; G07F 17/12; G07F 7/025;
(Continued)

(56) References Cited

U.S. PATENT DOCUMENTS

| 5,475,378 A | * | 12/1995 | Kaarsoo | A47G 29/141 |
| | | | | 235/382 |
| 6,344,796 B1 | * | 2/2002 | Ogilvie | A47G 29/141 |
| | | | | 340/5.2 |

(Continued)

FOREIGN PATENT DOCUMENTS

| GB | 2 372 126 | | 8/2002 | |
| GB | 2409748 A | * | 7/2005 | ............. G06Q 10/08 |

(Continued)

OTHER PUBLICATIONS

PCT/GB2014/000053 International Search Report dated May 8, 2014 (3 pages).

(Continued)

*Primary Examiner* — Edwin C Holloway, III
(74) *Attorney, Agent, or Firm* — Brinks Gilson & Lione; John C. Freeman

(57) ABSTRACT

A customer may collect a package from an automated collection point (ACP) operated by an entity having a central computer system, even when there is no functional communications link between the ACP and the central computer system. A first collection code is generated at the central computer system by means of an algorithm based on a data item particular to the package, such as a package identification code (package ID). The first collection code is sent to the customer who inputs it at the ACP, where it is validated independently using a corresponding algorithm based on a corresponding data item which is independently available to the ACP, preferably the same package ID which is carried by the package and scanned when the package is delivered.

24 Claims, 1 Drawing Sheet

(58) Field of Classification Search
CPC .......... A47G 2029/145; E05B 65/0075; E05B 65/025
USPC .......................................... 340/5.73; 705/339
See application file for complete search history.

(56) References Cited

U.S. PATENT DOCUMENTS

| | | | |
|---|---|---|---|
| 6,404,337 B1* | 6/2002 | Van Till | A47G 29/141 340/569 |
| 2002/0103653 A1* | 8/2002 | Huxter | G06Q 10/083 705/330 |
| 2003/0025590 A1* | 2/2003 | Gokcebay | G06Q 40/04 340/5.73 |
| 2003/0050732 A1* | 3/2003 | Rivalto | G06Q 10/08 700/237 |
| 2004/0164847 A1* | 8/2004 | Hale | A47G 29/141 340/5.73 |
| 2007/0247276 A1* | 10/2007 | Murchison | G07C 9/00087 340/5.2 |
| 2012/0194043 A1 | 8/2012 | Turner | |

FOREIGN PATENT DOCUMENTS

| | | |
|---|---|---|
| WO | WO 00/76378 | 12/2000 |
| WO | WO 02/07021 | 1/2002 |
| WO | WO 2011/065892 | 6/2011 |

OTHER PUBLICATIONS

PCT/GB2014/000053 Written Opinion of the International Searching Authority dated Apr. 29, 2014 (9 pages).
PCT/GB2014/000053 International Preliminary Report on Patentability dated Aug. 18, 2015 (10 pages).

* cited by examiner

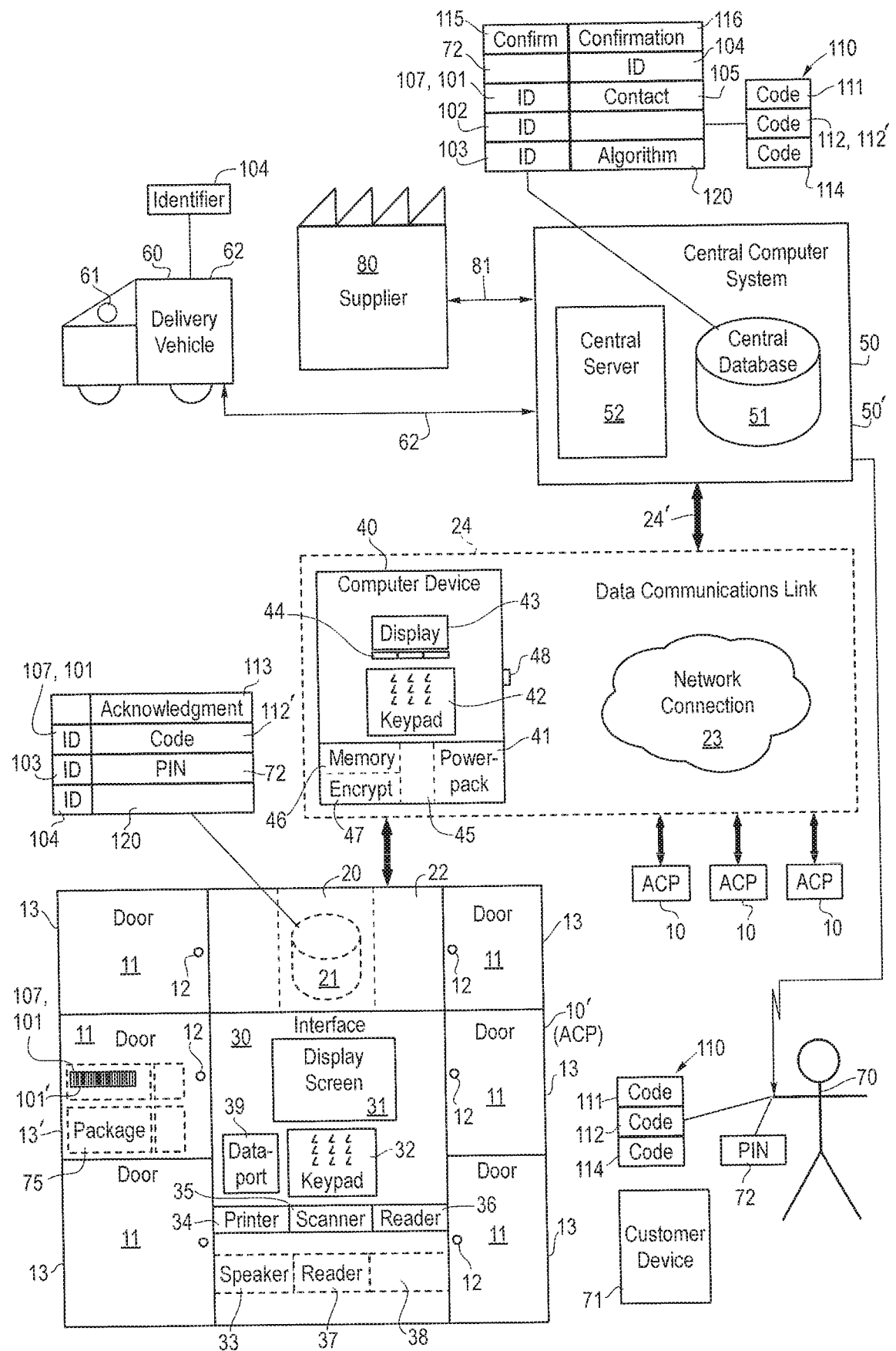

AUTOMATED COLLECTION POINTS AND METHOD OF OPERATION

This application claims priority to International Application No. PCT/GB2014/000053 filed Feb. 14, 2014 and to Great Britain Application No. 1302620.8 filed Feb. 14, 2013; the entire contents of each are incorporated herein by reference.

This invention relates to automated collection points used for the delivery and collection of goods.

An automated collection point (hereinafter referred to as an "ACP") comprises a secure enclosure or a group of secure enclosures, a local computer controlling access to the or each enclosure, and a local user interface whereby a user may interact with the local computer so as to obtain access to deposit a package (i.e. an article, for example, goods or a letter) in, or collect a package from, the enclosure or one of the enclosures.

The local computer includes a local memory and usually also a data link, which will generally comprise a hardwired or wireless data connection whereby data can be transmitted to and received from a central computer system which includes a memory comprising a database, whereby a group of ACPs are linked together to form a network serving a group of customers whose details are recorded in the database.

Networked ACPs may be used for example to provide a "last mile" delivery process for consumer goods ordered over the Internet, or to provide overnight delivery of time-critical parts for field service engineers.

Conventionally, a customer may access the enclosure to collect a package by inputting a collection code unique to the package at the user interface. This makes the collection process very secure, and also makes it possible to share enclosures between customers and to optimally control access to each package, contingent for example on payment of a fee. Disadvantageously however, when communication with the ACP is interrupted, the customer may be temporarily unable to collect a package.

It is desirable that each ACP should continue to function as far as possible during interruptions in data communications with the central computer system, and it is the object of the present invention to provide a method for operating a group of ACPs which is substantially secure while being less affected by interruptions in communication.

Accordingly the present invention provides a package delivery apparatus and method of operation as defined in the claims.

In a preferred embodiment, a package delivery apparatus comprises a network of automated collection points (ACPs) operated by a controlling entity via a central computer system and configured such that a customer may collect a package from one of the automated collection points, even when there is no functional communications link between the ACP and the central computer system. A first collection code is generated by a first collection code generating means at the central computer system by means of an algorithm based on a data item particular or unique to the package, such as a package identification code (package ID). The first collection code is sent to the customer who inputs it at the ACP, where it is validated independently using a corresponding algorithm based on a corresponding data item which is independently available to the ACP, preferably the same package ID which is carried by the package and scanned when the package is delivered. The ACP may be a stand-alone unit without a data link, or may be networked but temporarily out of communication with the central computer system.

The first collection code may be disabled at the ACP at any time before the collection takes place, for example, in response to a data transmission received from the central computer system via a network connection or a handheld device, so that collection must then be made instead using a random or pseudorandom second collection code sent to the customer from the central computer system and validated at the ACP by means of a corresponding authorisation code. Both first and second collection codes, or alternatively only one of the first and second collection codes may be transmitted to the customer.

Optionally, the second collection code may be generated by the ACP and transmitted to the central computer system on delivery of the package, and the ACP may disable the first collection code when it receives an acknowledgement from the central computer system. Alternatively for example, the ACP may disable the first collection code when it receives from the central computer system an authorisation code, either being the second collection code or a code corresponding thereto and from which the second collection code can be derived, which is generated at the central computer system and may be sent out together with the package as a data packet in a handheld unit and/or transmitted via a network connection.

A plurality of handheld units may provide multiple redundant data transmission routes. For each collection, if the necessary data transmission occurs before the package is collected, then that collection may only be permitted as long as the second code is used; and if the data transmission has not been effected by the time the customer arrives to collect the package, then collection is permitted automatically based on the first (algorithm based) code. Only one of the first and second codes may be sent to the customer, or alternatively the first and second codes could be combined (e.g. encrypted by an algorithm to create a composite code which is later decrypted by a similar algorithm at the ACP), and sent to the customer when a confirmation of delivery is received, or otherwise at any desired time. This makes it possible to operate a group of ACPs with different, intermittent or indeterminate data transmission capabilities, using a common methodology and with the security of each collection being optimised depending on the status of each data link up until the moment of collection.

Further features and advantages will be evident from the various illustrative embodiments which will now be described, purely by way of example and without limitation to the scope of the claims, and with reference to the accompanying drawing, in which:

FIG. 1 represents a package delivery apparatus comprising an ACP network and a remote computer system.

Referring to FIG. 1, the network comprises a plurality of ACPs 10, 10', each ACP comprising a secure enclosure 13, 13' or a group of secure enclosures 13, 13', a local computer 20 (e.g. a microcontroller or any other suitable processing means) controlling access to the or each enclosure, and a local user interface 30 operably coupled to the local computer. Usually, the enclosures comprise a block of lockers 13, 13' as shown, each having an individual door 11 which is locked and unlocked by a lock 12 and, optionally, closed and/or opened by automated closing/opening means, all under the control of the local computer. Alternatively there can be a single enclosure. The user interface 30 may comprise a display screen 31, a keypad 32 or touchscreen, a speaker 33, a label printer 34, a barcode scanner 35, a card reader 36, a tag reader 37, RFID or other short range wireless scanning and communication means 38, and a data port 39.

Communication means 38 and data port 39 may include means for transmitting (downloading) to and receiving (uploading) from a portable handheld scanner and computer device 40 carried by delivery personnel, which typically comprises a power pack 41, a keypad 42, a touchscreen or display screen 43, a barcode scanner 44, RFID and/or other short range wireless scanning and communication means 45, a memory 46, signature capture and data encryption software 47, and a data transfer port 48 whereby it may be connected to the data port 39 and to the central computer system 50 or a computer system of the delivery company 60 to upload or download data; such devices being well known in the art and hereinafter referred to as a "handheld device".

The local computer 20 includes a memory 21 and local data communication means 22 having a network connection 23 which provides a data communications link 24 whereby data can be transmitted to and received from the remote, central computer system 50 which includes a remote, central server 52 and a remote, central memory comprising a remote, central database 51, whereby many ACPs are linked together to form a network serving a group of customers 70 whose details are recorded in the database 51. The remote, central computer system and its memory are referred to hereinafter as "remote" and "central", these terms being used interchangeably, because they are separate from the ACPs in the network; although of course they may be provided as a spatially distributed network of computing resources.

Typically the network connection 23 is a wireless or hard wired link, over which the ACP uploads data relating to each delivery or collection to the central computer system, either immediately or in regular batches, and also periodically downloads data from the central computer system.

Alternatively or additionally, the data link 24 may be implemented via the handheld device 40 which stores and transfers data between the ACP and the central computer system every time it communicates therewith. In this way each handheld device (and each of a large number of delivery personnel 61 may be provided with such a device) can provide a redundant and parallel data transmission route, either parallel with or even instead of a hardwire or wireless network connection 23 to the ACP.

In this way, details of each delivery can be stored on the handheld device 40 of the individual 61 making that delivery—for example, by using the handheld device to scan a package identification code 101 (hereinafter referred to as a "package ID") that identifies that package 75, before scanning the package ID for a second time at the user interface. The package ID 101 is preferably unique to the package 75 and can be any numerical, alphabetical, alphanumerical or other data string, and may be provided for example as a barcode 101' on a label stuck to the package. The package ID and other details (e.g. date and time, ACP location, the identity of the personnel making the delivery, and so forth) are then uploaded from the handheld device 40 to the central computer system 50 when the device is returned to a central depot with a data connection, so as to provide two parallel, alternative and redundant routes by which this data can reach the central computer system.

Alternatively, batches of data (including for example details of all deliveries to an ACP not yet notified to the central computer system, or details of all changes in the central database which have not yet been notified to an ACP, such as package IDs, personal IDs, customer IDs, customer PINs, the status of each customer's account with amounts owing, etc.) can be downloaded, respectively from the ACP 10, 10' and from the central computer system 50 and stored in the handheld device 40, and then uploaded respectively to the central computer system when the handheld device is returned to depot, and to the ACP when a delivery is made.

It will be understood therefore that each ACP 10, 10' is preferably capable of operating independently of the central computer system 50 so that it can continue to facilitate the delivery and collection of packages in the event that communication between the ACP and the central computer system is interrupted; which is known as an "asynchronous" system. This is preferred over the traditional system whereby each ACP is controlled directly by the central computer system in real time, and is hence incapable of accepting a delivery or allowing a collection when network communications are down; which is referred to as a "synchronous" system. Advantageously, the central computer system 50 may be configured to re-boot the local computer 20 and repopulate its local memory 21 if the local computer crashes.

Typically a delivery is initiated by providing details identifying a package 75 to the central computer system 50, either via a data link 81, 62, such as from a supplier 80 or delivery organisation 60, or by scanning a barcode 101' or the like on the package or a readable tag inside the package when the package is received at an ACP 10, 10' or at a depot of the entity 50' operating the network, or both. The details may include a package ID 101, which is preferably unique to the package and may be an order number or a tracking number 107 generated by an entity other than that controlling the central computer system—for example, by a supplier 80 of the goods (which may be an online retailer or any other entity, such as an employer of the customer 70 to whom the goods are addressed), or by another delivery organisation 60 that delivers the goods to an ACP. The tracking number 107 may be generated by software resident with the other entity but validated or controlled by the central computer system so that the central computer system can recognise the tracking number and derive from it information, e.g., the identity of the supplier 80 or delivery organisation 60 that generated it, or the identity of the customer 70 to whom the package 75 is to be delivered. Alternatively this information may be included with the other details provided to the central computer system.

When the remote computer system receives the details of the package 75, it may generate a package ID 102; alternatively, where a tracking number 107 is included in the details provided by the supplier or delivery organisation, then the tracking number 107 may be used as the sole package ID 101 as in the example illustrated. Generally the tracking number will be applied to the package at its point of origin; so that although another package ID 102 may be generated by the central computer system and stored in association with the tracking number 107, it can be, but need not be applied to the package; while the tracking number 107 on the package may conveniently be used as the package ID 101 that is carried by the package and scanned when the package is delivered.

The customer 70 to whom the package 75 is to be delivered may have been registered in the database 51 at some previous time; or alternatively, the customer's details may be added to the customer database 51 contemporaneously with the details of the package (for example, where the customer has never used the ACP network before, but selects it as a delivery option when ordering goods over the Internet via a vendor 80 website that is linked to the central computer system and configured to offer that option). At least one package ID 101, 102 is recorded in the central database 51 along with a code 103 (for example, a numerical, alphabetical, alphanumerical or any other data string) uniquely identifying the customer to whom the package is to be delivered, hereinafter referred to as the "customer ID". Similarly to the package ID, more than one customer ID may be used to identify a customer.

The package ID 101, 102 and the customer ID 103 may be separate and/or may be embedded in a composite code, for example, by combining the customer ID 103 and the tracking number 107 as a barcode on the package, or as a text string included in an address label on the package giving for example the address of a central depot of the entity 50' operating the ACP network, to which a vendor 80 may dispatch a package for subsequent delivery on to a selected ACP. The package ID 101, 102 and/or the customer ID 103 may also be encrypted.

The package is then delivered by a delivery organisation 60 (which may be independent or alternatively may be associated with the supplier 80 or with the entity 50' controlling the ACP network) to the ACP 10' selected (contemporaneously with the order or at some previous time as a preference stored in the remote memory) by the customer 70, which conveniently may be the ACP located closest to the customer's home or workplace.

When the package 75 is delivered to the ACP 10', the delivery personnel 61 making the delivery via delivery vehicle 62 will use the user interface 30 to gain access to deposit the package in one of the enclosures 13'. It is desirable to ensure as far as possible that each ACP will always accept a genuine delivery, while preventing access to empty enclosures by persons not making a genuine delivery. This can be accomplished in various ways.

In a first mode of operation the central computer system sends the package ID 101 and optionally the customer ID 103 to the selected ACP 10', which stores the details in the local memory 21 of the local computer 20. When the package is delivered to the ACP 10', the package ID 101 represented by the package barcode 101' is scanned by the delivery personnel 61 and identified by the local computer from the details stored in the local memory, whereupon the door of an empty enclosure 13' is unlocked and/or opened to receive the package. The package is placed inside and the door is closed, either manually or automatically, and then re-locked by the local computer which records in the local memory the identity (package ID 101) of the package secured in that enclosure. Where the package ID 101 is encoded as a barcode 101' on the package or as a wirelessly readable tag (not shown) in the package, it may be read by a scanner incorporated into the user interface, or alternatively typed in via the keypad; alternatively it may be scanned by the handheld device 40 and then uploaded from the handheld device to the user interface.

This mode of operation is suitable for use in an asynchronous system, wherein a package is accepted for delivery as long as the ACP has received details of the package from the central computer system at any time prior to the moment of delivery.

In a second, alternative mode, the ACP may recognise the package ID 101 as a valid code, for example, insofar as it corresponds to a predefined format, or insofar as it can be decoded by means of a predefined algorithm to yield a predefined result. For example, the package ID 101 may be a composite numerical string comprising a unique package identifier together with a predefined header and a checksum which is validated on delivery by the ACP, or may comprise a unique package identifier together with a predefined validation code which is encoded and then decoded and recognised by the ACP on delivery.

In this mode of operation, the ACP will accept any package with a package ID that can be identified as a valid code. The ACP 10' is then able to store the package ID 101 and transmit it to the central computer system 50, either contemporaneously with receiving the delivery or at some subsequent time; thus it will be understood that this mode of operation is also suitable for use in an asynchronous system, and moreover, that it enables the ACP to accept delivery of a package, even where the ACP has not previously received details of the package from the central computer system.

In a third mode of operation, the ACP may be configured to accept delivery when a delivery personnel identifier 104 (hereinafter referred to as a "personal ID") is received at the user interface. The personal ID 104 uniquely identifies a delivery organisation or alternatively an individual within a delivery organisation. The ACP 10, 10' may be configured to accept a package when a personal ID is received and either validated by reference to a corresponding personal ID stored in the local memory 21, or (if not stored in the local memory) validated in a similar way to the package ID in the second mode of operation, for example, by its format or by means of an algorithm. A personal identification number (i.e. a personal security code unique to an individual, hereinafter referred to as a "PIN") associated with the personal ID 104 may also be required. The ACP may be configured to only accept the package when a unique package ID 101 is also entered via the user interface. In this way the ACP may accept any package from a known delivery organisation, irrespective of the format of the package ID 101. This may be useful for example where the organisation delivers packages from several different suppliers 80, each bearing a package ID in the form of a tracking number 107 whose format may be changed from time to time without notice to the central computer system.

In a fourth mode of operation, the ACP 10, 10' may be configured to accept a package from any individual registered in the database as a customer; for example, by scanning a customer membership card or inputting a customer ID 103 together with a PIN; and, optionally, contingent on also entering name and address details, and/or a customer ID associated with another customer also registered in the database, identifying the addressee of the package. In this way the ACP may be used by customers of the network to send packages to other customers; whereby the package is collected by a delivery organisation 60 (either associated with the entity operating the network, or independent thereof) and then delivered to another customer, for example, via another ACP 10. By periodically downloading from the remote computer system a list of customer IDs (but preferably not including other customer details, such as street addresses, telephone numbers, email addresses or other contact details 105, which are stored for security only in the central computer system), the ACP may be configured to operate in the fourth mode, also asynchronously, i.e. during interruptions in communication with the network.

Other modes of operation may be envisaged by those skilled in the art.

Different modes of operation may be combined. Moreover, each ACP may be configured to enable one mode of operation and disable another mode of operation, contingent on the status of its data communications link 24 with the central computer system.

For example, an ACP that is temporarily out of communication with the central computer system may be configured to operate in any of the first, second, third or fourth modes, whereby in the third mode any package from a known delivery organisation is accepted, and the package ID is stored and communicated to the central computer system when communications are restored. On receiving a package ID via the user interface, the ACP may be configured to first check the local memory for a corresponding stored package ID in accordance with the first mode; and then, if no match is found, to validate the package ID 101 in accordance with the second mode; and then, if validation is unsuccessful, to require the delivery personnel (e.g. via a message through the speaker or on the display screen) to input a valid personal ID 104 in accordance with the third mode; and in any case, to accept a package deposited by a customer in accordance with the fourth mode. The ACP may be configured to disable the second mode and/or the third mode when communications are resumed and an updated list of pending deliveries is received from the central computer system. The mode of validation of each delivery may be reported from the ACP to the central computer system.

Depending on the mode of operation adopted for the delivery of the package, it will be recognised that the details of the package 75 including a data item particular to the package and preferably unique to the package, hereinafter referred to as the "remote data item", which is preferably the package ID 101 but alternatively could be any of the other data items related to the package, along with other data items related to the package such as the further package ID 102 and the associated customer ID 103 of the addressee 70, may be provided to the central computer system and stored in the remote memory 51 before the package is delivered to the selected ACP; or alternatively, when the package is delivered; or alternatively, may be stored in the local memory of the ACP to which the package is delivered, and transmitted to the central computer system and stored in the remote memory 51 at some time thereafter, depending on the nature and status of the data communications link 24 to that ACP.

Irrespective of the mode of delivery, a local data item corresponding to the remote data item, and preferably the package ID 101, will be stored in the local memory 21 in association with the identity of the locker 13' when it or a related data item is input via the local interface on delivery of the package 75 to the ACP 10'.

Preferably, both the local data item and the remote data item are identical pieces of data unique to the package and independently available to the remote computer system and the ACP, and preferably carried on or in the package, and most preferably they both correspond to the package ID 101; for example, either or both of the local data item and the remote data item may be identical to the package ID, comprise the package ID, or otherwise correspond to the package ID.

Following or responsive to the delivery of the package 75 to the ACP, a communication sequence comprising at least one, optionally more than one data transmission 24' is initiated between the ACP 10' and the central computer system 50. The communication sequence may comprise at least one data transmission 24' from the ACP 10' to the central computer system and at least one data transmission 24' from the central computer system to the ACP 10'.

The communication sequence may be initiated by the ACP 10' or handheld device 40 immediately on receipt of the package 75 at the ACP 10', or may be initiated by the ACP 10' or the remote computer system 50, for example, as a periodic, scheduled batch data transmission from the ACP 10' which contains details of all deliveries received at the ACP 10' since the last successful communication. The at least one data transmission 24' may include a second collection code 112 and/or a related or identical authorisation code 112'. The ACP 10' may generate the second collection code on delivery of the package 75, store it as an authorisation code 112' in the local memory 21, and also transmit it in the at least one data transmission 24' to the central computer system 50, as further explained below.

After the package 75 has been delivered to the ACP 10', and at the latest at the time of collection of the package 75 from the ACP 10' by the customer, a determination is made as to whether the communication sequence comprising the at least one data transmission 24' has been completed. The determination may be implicit and inherent in the instantaneous data state of the local computer at the time of collection of the package 75, being defined by the presence or absence of the authorisation code 112' as further explained below. Alternatively it may be an explicit logical step carried out in advance of the time of collection. In one embodiment, the step of determining whether the communication sequence has been completed is carried out by a scheduled process at the central computer system 50 after a predetermined period of time has elapsed, starting from a trigger event. The trigger event may be the delivery of the package 75 which is determined, for example, by a separate confirmation from a handheld device 40 used by the personnel carrying out the delivery, or by the expected time by which the delivery should have taken place; or it may be for example a first data transmission 24' from the central computer system to the ACP 10' subsequent to the delivery of the package. In each case, the package delivery apparatus will include a determination means for making the determination; the determination means may be a processing or memory resource, for example, a memory resource containing the authorisation code, or a processing routine for setting a data flag in a memory resource of the local or remote computer.

The procedure for collection of the package is then dependent on whether the communication sequence comprising the at least one data transmission 24' has been completed, at the latest by the time of collection of the package; which is to say, whether the data link 24 is fully functional (in which case the communication sequence will have been completed), or whether it is not functional (in which case the communication sequence will not have been completed).

In either case, a collection code 110 is generated and sent to the customer. The collection code 110 may be generated at any time after the central computer system receives details of the package 75 or after it is delivered to the ACP 10'.

If the communication sequence is not completed, or alternatively, irrespective of whether the communication sequence is completed, the collection code 110 will include a first, non-random collection code 111 which is generated by the first collection code generating means at the remote computer system 50. The non-random collection code 111 is based on the remote data item (in the illustrated example, package ID 101) which is stored in the remote memory 51 and corresponds to the local data item 101 in the local memory 21.

The first collection code generating means may be any suitable hardware or software resource for generating the first collection code in one or more steps, including for example by creating a copy or modified copy of the remote data item, and may be linked to or form a part of a processor of the central computer system. It may include a code generating algorithm running on a processor. In one scenario, the package ID could be stored momentarily in the remote memory (either in modified or unmodified form) as the remote data item while it is copied or converted by the algorithm to provide the first collection code, and then the first collection code could be stored until required or (if not required) deleted. In another scenario, the package ID could be stored (either in modified or unmodified form) as the remote data item in the remote memory while the package is delivered, and then, if and when the first collection code is required, copied or converted by the algorithm to provide the first collection code.

Alternatively or additionally, the collection code 110 may comprise a second collection code 112 or composite collection code 114, as further explained below.

The collection code 110 is transmitted to the customer 70 who is recorded (by association of the customer ID 103 with the package ID 101, 102) in the central database and/or in the local memory 21 of the ACP 10' as the addressee of that package in accordance with the customer's personal contact details 105 which are retrieved from the remote memory 51. These details include the preferred method of communicating with that customer, such as the customer's mobile phone number or email address which is held securely in the remote memory 51, and so the communication is preferably made to that number or address, directly from the central computer system rather than from the ACP. The transmission of the collection code 110 to the customer can be triggered by any event, for example, automatically at the time that the delivery is expected or scheduled to have been made, or by an electronic confirmation 115 of delivery from the ACP which may form part of one or more data transmissions 24' comprising the communication sequence, at the discretion of the entity operating the ACP network.

When the customer 70 wishes to collect the package, he enters the collection code 110 comprising the first collection code 111 into the user interface of the ACP 10'. The first collection code 111 is then validated by the local computer 20 of the ACP by means of the local data item (package ID 101) stored in the local memory.

Conveniently, the first collection code 111 is generated at the remote computer system from the package ID 101 based on an algorithm 120, which is also stored in the local memory 21 of the ACP 10'. When the first collection code is later entered into the user interface 30 by the customer 70, it is then validated at the ACP by applying the same algorithm 120 to the package ID 101 which was stored in the local memory 21 when the package was delivered, to obtain a result; and comparing that result with the first collection code 111 entered via the user interface to see if they match. Although the package ID may be obtained by anyone having access to the package in transit, the first collection code 111 is thus secure by virtue of the (secret) algorithm 120 used to generate and validate it independently at the central computer system 50 and at the ACP 10'.

Alternatively the remote computer system and the ACP may use different but related algorithms to respectively generate and validate the first collection code 111 based on different but related data items. The local and remote data items may thus comprise two different pieces of data, wherein both pieces of data are linked so that one can be derived from the other.

For example, a second package ID 102 may be generated by the remote computer system by means of an algorithm based on a second package ID 101 comprising a tracking number 107 generated by the supplier of the package. The first collection code can be generated at the remote computer system based on the second package ID 102, and later validated at the ACP by applying a different but related algorithm to the tracking number 107 scanned from the package on delivery.

Alternatively for example, the local and remote data items may be based on the corresponding customer ID and/or some other item or items of information related to the package and independently available to both the ACP and the central computer system, such as the identity of the ACP, the date of delivery, the personal ID 104 of the individual 61 scheduled to make the delivery, or the like.

The local computer 20 is arranged to provide the customer 70 with access to the enclosure 13' to allow collection of the package 75 at the time of collection (which is to say, at whatever subsequent time the customer arrives at the ACP 10' to collect the package 75) responsive to validating at least the first collection code 111 that is received via the user interface 30. Optionally, the customer may be required also to enter other requisites such as a customer identity card or number and/or a customer PIN 72, which can be held in the local memory 21 (perhaps as part of a previous data download from the remote computer system 50) and/or encoded in or otherwise associated with the package ID 101. The ACP 10' may be arranged to also prompt the customer 70 to pay for the collection, e.g. by approving a contactless funds transfer or entering their credit card via the user interface 30, before access is provided.

If the communication sequence is completed, which is to say, if the data link 24 is fully functional, then the first collection code 111 is preferably disabled, which is to say, the ACP is configured, e.g. by an instruction included in the communication sequence, to not subsequently provide access to the enclosure to permit collection of the package responsive to receiving at least the first collection code 111 but not the second collection code 112 at the user interface. Optionally, the first collection code 111 then may not be sent to the customer. Collection is then facilitated by transmitting to the customer (who subsequently enters it into the user interface) the second collection code 112, which is more secure than the first collection code because it is not based on and therefore cannot be derived from the local or remote data item (nor, preferably, from any other data item associated with the package), and is preferably a random or pseudorandom code.

Preferably, the at least one data transmission contains the second collection code or the authorisation code corresponding to the second collection code, or a related code from which the second collection code or the authorisation code can be derived.

The second collection code 112 is generated by a second collection code generating means, optionally at the central computer system. The central computer system then transmits the second collection code to the customer using the customer's contact details 105 and also transmits a corresponding authorisation code 112' to the ACP where it is stored in the local memory 21. The authorisation code can be identical to the second collection code (as in the illustrated example); alternatively (to guard against possible data interception) the authorisation code may be different from the second collection code but related to it, for example, by encrypting the second collection code using an algorithm to obtain the authorisation code, and then subsequently decrypting the authorisation code at the ACP using a corresponding algorithm so as to enable validation of the second collection code input at the user interface.

Alternatively, the second collection code 112, or a related code from which the second collection code may be derived—for example, an encrypted version of the second collection code—may be generated by the second collection code generating means at the ACP on delivery of the package 75 and stored as the authorisation code 112' in the local memory 21, and also transmitted as part of the communication sequence from the ACP to the central computer system 50, which may then transmit an acknowledgement 113 to the ACP and the second collection code 112 to the customer.

Preferably the second collection code generating means is a random or pseudorandom code generator, which may be implemented by any suitable hardware or software resource either linked to or forming part of the central computer system or local computer. Of course, it is possible for the first and second collection code generating means to share a common hardware or even software resource which is arranged to generate respectively the first or the second collection code.

When the customer 70 enters the collection code 110 comprising at least the second collection code 112 at the user interface 30, optionally together with a customer PIN, payment, and/or other requisites, the second collection code 112 is validated by the local computer 20 by means of the authorisation code 112', conveniently by determining whether the codes 112, 112' are the same, or whether one can be derived from the other by means of a stored algorithm. The local computer 20 is arranged to provide access to the enclosure to allow collection of the package if validation is successful.

In an alternative embodiment, rather than storing the authorisation code 112' in the local memory 21 in advance of the time of collection, the authorisation code 112' may be transmitted from the central computer system 50 at the time of collection and stored in the local memory only as a transient data item while the local processor compares it with the collection code 112 entered via the user interface; this however being less preferred as being a synchronous rather than asynchronous mode of operation.

Optionally, both the first and second collection codes 111, 112 may be generated and transmitted to the customer at the same time, either as separate codes or, more conveniently, by combining them to form a composite collection code 114. In this case the step of receiving the first or second collection code at the user interface is to be construed as including receiving at the user interface a composite code which contains the respective first or second collection code or from which the respective first or second collection code can be derived.

Alternatively only one of the first and second collection codes 111, 112 may be transmitted to the customer, as further discussed below. This minimises the number of occasions on which a non-random code is transmitted and so is considered to be the best mode of operation.

Whichever methodology is adopted, the customer need not be aware of which code has been transmitted and so only needs to enter the collection code 110 into the user interface, irrespective of whether that code 110 comprises codes 111, 112 or 114. Optionally, the communication sequence may include a delivery confirmation 115 which is sent via the data link 24 from the ACP to the remote computer system responsive to delivery of the package 75 to the ACP, and the first and/or second collection codes 111, 112 are transmitted to the customer (either separately or contained in a composite collection code 114) responsive to receipt of the delivery confirmation 115 at the remote computer system.

If by the time of collection the communication sequence has not been completed, so that the ACP has not received from the central computer system the authorisation code 112' generated by the central computer system or an acknowledgement 113 of receipt of the second collection code 112 or related code generated by the ACP, then the local computer provides access to the enclosure to allow collection of the package responsive to receiving at least the first collection code 111 (or the composite code 114 which is decoded to obtain the first collection code 111), but not the second collection code, at the user interface.

If the ACP does receive from the central computer system the authorisation code 112' or the acknowledgement 113, then the first collection code 111 is preferably disabled. The acknowledgement 113 may function as an instruction to the ACP to disable the first collection code. The local computer is arranged so that, after the first collection code is disabled, access is provided to the enclosure to allow collection of the package 75 responsive to receiving at least the second collection code 112 (or the composite collection code 114 which is decoded to obtain the second collection code 112) at the user interface, but not responsive to receiving at least the first collection code 111 but not the second collection code 112 (or any other composite code which is decoded to obtain the first collection code 111 but not the second collection code 112) at the user interface.

It will be appreciated that an ACP that does not have a permanent network connection 23 may therefore still benefit from the enhanced security of a random or pseudorandom second collection code 112, which conveniently may be generated at the central computer system and sent to the client simultaneously with the first collection code, by providing a data link via a plurality of handheld devices 40, each of which represents a parallel and redundant data transmission route between the ACP and the central computer system. The handheld devices are arranged so that the authorisation code 112' can be downloaded from the central computer system to the or each respective handheld device 40 by the or each of the delivery personnel and carried physically to the ACP, conveniently (but not necessarily) at the same time as the package 75, and then uploaded from the handheld device to the ACP when the delivery or another delivery is made. If the device 40 is not working properly or if the delivery person forgets to download or upload the data then the first collection code 111 is generated independently at the ACP and used to validate the collection. If the data upload is successful then the ACP disables the first collection code 111 (which is to say, does not generate or use it), and instead stores the authorisation code 112' in the local memory 21 until such time as the collection takes place. The first collection code 111 may thus be disabled and the second collection code 112 enabled (i.e. the ACP may be configured to provide access based on the second collection code and deny access based on the first collection code) at any time before the delivery takes place.

Optionally, the first and second collection codes may be sent to the customer simultaneously, either automatically at whatever time the delivery is expected or scheduled to have taken place, or when the central computer system receives confirmation of the delivery. This confirmation may be via a data transmission 115 from the ACP included in the at least one data transmission 24' comprising the communication sequence and confirming that the package 75 has been secured in an enclosure 13', or by any other desired means, e.g. a manual input consequent on a verbal assurance from the delivery personnel, depending only on the level of certainty (if any) deemed appropriate by the entity operating the group of ACPs to trigger the notification to the customer that the package has arrived. Where commercial considerations make it imperative to avoid notifying the customer that a collection may be made where in fact the package has not been delivered as expected, a high level of certainty may be preferred.

It will be appreciated therefore that the data link 24 may be said to be "fully functional" and the communication sequence to have been completed, if the authorisation code 112' or acknowledgement 113 has arrived at the ACP by the time the collection takes place; and conversely, the data link 24 may be said to be "not functional" or only partially functional, and the communication sequence not completed, if the authorisation code 112' or acknowledgement 113 has not been transmitted at all, or, for example, if it has been downloaded onto a handheld device but is still in transit and has not yet arrived at the ACP by the time the collection takes place. Therefore a determination of whether the data link 24 is functional, which is to say, whether the communication sequence has been completed, can be made in practice at the time of collection by the customer. The collection code 110 is of course transmitted to the customer before this happens, on receipt of whatever is deemed to be adequate confirmation that the delivery has taken place. The choice of first 111 or second 112 collection codes however may be made on transmission of the collection code 110, or later on at the time of collection, depending on the methodology selected.

Where the ACP does not have a functioning data link, then the first collection code 111 may be used for every collection, so that the second collection code 112 is not used. The network may thus comprise a mix of ACPs with and without data links, which is particularly useful where ACPs (perhaps with only one enclosure or a few enclosures serving one or a few customers) need to be located in remote places where it would be impractical to provide a data link. The invention can thus provide a very flexible network that accommodates different hardware and service levels and allows each ACP to be upgraded from a stand-alone unit to a data linked unit, and conversely to be downgraded if the data connection is lost. Equally, remote ACPs without a permanent data link may make use of an intermittent data link via the handheld device 40 carried by delivery personnel, whereby each collection may be made using the first or the second collection code, contingent on whether the necessary data transfer has been accomplished by the time the collection takes place.

Where the central computer system receives details of the package before it is delivered to the ACP, and the handheld device 40 provides a fully functional data link between the ACP and the central computer system, the authorisation code 112' may be generated at the central computer system and transmitted to the ACP via the handheld device 40 at the time that the package is delivered; the second collection code 112 may then be enabled and the first collection code 111 disabled, when the local memory 21 has received both the authorisation code 112' (from the handheld device 40) and the package ID 101 (via the user interface 30) and has recorded the identity of the enclosure 13' in which the package is secured. If the handheld device 40 is not working properly then collection may be facilitated responsive to inputting the first collection code 111 via the user interface until such time as the authorisation code 112' is received in a later data update via another handheld device 40.

In embodiments where only one of the first and second collection codes is transmitted to the customer, the generation of the first and/or second collection codes and/or the transmission of the first or second collection code to the customer may be contingent on a determination of whether the data link is fully functional, partially functional or not functional, which determination may be made periodically or may be triggered by any desired event and may be repeated for any desired predetermined time period, following which either the first or the second collection code may be transmitted to the customer (if previously generated) or generated and transmitted to the customer (if not previously generated). For example, the first collection code might be transmitted to the customer if no response completing the communication sequence is received from the ACP by the central computer system within 15 minutes of the initiation of the communication sequence.

In one embodiment, the communication sequence includes an authorisation confirmation 116 which is sent via the data link 24 from the ACP 10' to the remote computer system 50 responsive to receipt at the ACP from the remote computer system of the authorisation code 112' or of the acknowledgement 113 of receipt by the remote computer system of the second collection code 112 or related code generated at the ACP.

In this embodiment, the authorisation confirmation 116 thus comprises the last of two or three data transmissions 24' which together comprise the complete communication sequence. Specifically, the delivery confirmation 115 and/or the second collection code 112, is sent in a first transmission from the ACP to the central computer system; then the acknowledgement 113 or the authorisation code 112' is sent in a second transmission from the central computer system to the ACP; and then the authorisation confirmation 116 is sent in a third and final transmission from the ACP 10' to the central computer system. Alternatively, the authorisation code 112' may be sent from the central computer system to the ACP in a first data transmission 24' responsive to the delivery of the package which is identified by another trigger, such as by a manual procedure carried out by the delivery personnel, and the authorisation confirmation 116 (also serving as a confirmation of delivery) is then sent in a second and final data transmission 24' completing the communication sequence from the ACP 10' to the central computer system.

The data transmission 24' containing the authorisation code 112', or the acknowledgement 113, may include an instruction to the ACP to disable the first collection code, in which case the authorisation confirmation 116 confirms that the first collection code has been disabled.

The second collection code 112 may then be transmitted from the remote computer system to the customer 70 responsive to receipt of the authorisation confirmation 116 at the remote computer system; in which case, the first collection code 111 may not be generated or transmitted to the customer. If the authorisation confirmation 116 is not received within a predetermined period following the delivery (for example, within a predetermined period following receipt at the remote computer system of the confirmation 115 of the delivery) the communication sequence is deemed incomplete, and the first collection code 111 may then be generated and transmitted from the central computer system to the customer 70.

In alternative embodiments, the communication sequence may include more than three data transmissions 24', or only one data transmission 24'.

For example, responsive to delivery of the package, the status of the data link may be confirmed, following which a single data transmission 24' may be sent from the ACP 10' to the remote computer system, including the second collection code 112, with the first collection code 111 being disabled on transmission. On receipt of the single transmission, the remote computer system sends the second collection code 112 to the customer. If the transmission cannot be sent, the first collection code is not disabled, and the remote computer system sends the first collection code 111 to the customer. Of course, in each case, the complete communication sequence includes the steps of both sending and receiving the or each data transmission.

In some embodiments, where the communication sequence is not complete, access may be provided to the enclosure 13' to allow collection of the package 75 responsive to receiving at least either the first collection code 111 or the second collection code 112 at the user interface 30.

It will be appreciated that, where the data link 24 is effected via a plurality of hand held devices 40, the functionality of the data link (and hence which of the first and second collection codes is used to authorise the collection) may be determined at the moment of collection depending on how frequently the ACP receives data uploads via a hand held device, and how long it takes for data to be transferred in that way between the ACP and the central computer system.

Conveniently, the first or second collection code or the composite collection code can be provided to the customer in the form of a numerical, alphabetical or alphanumerical code via a text message or email, so that the customer can type it into the keypad of the user interface. Of course, the collection code can take any other form.

It is also possible for the customer to be provided with a dedicated customer device 71 having a small keypad and a display screen or data output means (such as a short range wireless transmitter or a data port), or alternatively with a piece of software resident on a mobile telephone or other device belonging to the customer having corresponding hardware features, whereby the collection code 110 transmitted by the central computer system is input (either directly or by the customer, e.g. via the keypad) into the device, optionally in encrypted form whereafter it is decrypted by the device, and perhaps together with a PIN or the like which is manually input by the customer.

The customer's device may then produce a further collection code corresponding to the first or second collection code or composite collection code, and that further collection code is then input into the local interface of the ACP (e.g. as a barcode displayed on the screen of the customer's device which is scanned by the scanner of the local interface, or by short range wireless transmission, or by the customer via the keypad of the local interface) which processes it in a similar way to the first or second collection code or composite collection code so as to provide access to the package.

It is to be understood therefore that transmitting the first or second collection code or composite collection code to the customer is to be construed also to refer to transmitting the first or second collection code or composite collection code to the customer's device, and the terms: "first collection code", "second collection code" and "composite collection code" are to be construed mutatis mutandis also to refer to a further collection code derived in this way from the first or second collection code or composite collection code transmitted from the central computer system to the customer, the further code being entered into the user interface of the ACP so as to collect the package.

In alternative embodiments, the or each enclosure of the ACP could also comprise a secure compartment or a region within a secure compartment, wherein the local computer provides access to the enclosure by mechanically conveying the package to or from the compartment, the ACP then being configured with a single access hatch or the like.

It will be understood therefore that if the communication sequence has not been completed, access is provided to the enclosure to allow collection of the package responsive to receiving at least the first collection code but not the second collection code at the user interface; which is to say, the first collection code (plus, optionally, any further personal identification code or the like) is sufficient and the second collection code is not required, so that the enclosure is unlocked if the first collection code (plus, optionally, any further personal identification code or the like) is received at the user interface, although optionally, the enclosure may also be unlocked if the second collection code is received either on its own or together with the first collection code at the user interface.

If the communication sequence has been completed, access is provided to the enclosure to allow collection of the package responsive to receiving at least the second collection code at the user interface, but not responsive to receiving the first collection code but not the second collection code at the user interface; which is to say, the second collection code (plus, optionally, the first collection code and/or any further personal identification code or the like) is sufficient to unlock the enclosure, but the first collection code without the second collection code is not sufficient.

In a further development, where the communication sequence has been completed, collection of the package may be facilitated responsive to receiving both the first and the second collection codes at the user interface, either separately or, more conveniently, as a composite code, so that neither code alone is sufficient to unlock the enclosure. Where the composite code is created by encrypting the first and second collection codes using a first encryption algorithm, the two codes may be subsequently obtained by decrypting the composite code at the ACP using the first algorithm, and the first code then validated based on the package ID by means of a second, validation algorithm.

In an alternative but less preferred embodiment, the first collection code is not disabled when the communication sequence has been completed. In this case, access is provided to the enclosure to allow collection of the package responsive to receiving at least the second collection code at the user interface; which is to say, the second collection code (plus, optionally, the first collection code and/or any further personal identification code or the like) is sufficient to unlock the enclosure. The first collection code may also be sufficient to unlock the enclosure; but preferably only the second collection code is transmitted to the customer.

Of course, even in embodiments where in normal use the enclosure is unlocked only in response to the first collection code (where the communication sequence has not been completed) or only in response to the second collection code (where the communication sequence has been completed), the local computer may be configured to open the enclosure, also in response to an override instruction from the user interface or the remote computer system; for example, to facilitate maintenance or correction of abnormal conditions, to release uncollected packages for return to depot, or where the random or pseudorandom codes for two lockers in the same ACP are coincidentally identical, in which case the affected lockers may default to a locked condition with access being permitted by an override code generated by the central computer system.

Many other possible adaptations will be evident from the foregoing description to those skilled in the art, and it is to be understood that the scope of the invention is limited only by the claims.

The invention claimed is:

1. A method of operating a package delivery apparatus comprising a network of automated collection points (ACPs) and a remote computer system, the remote computer system including a remote memory;

each ACP comprising at least one secure enclosure, a local computer having a local memory, and a local user interface in communication with the local computer, the local computer having at least one data link for communicating with the remote computer system, the local computer controlling access to the enclosure;

the method comprising:

providing to the remote computer system details of a package for delivery to a customer, wherein contact details of the customer are stored in the remote memory; delivering the package to a selected one of the ACPs, securing the package in a respective enclosure, and storing in the respective local memory a local data item relating to the package;

initiating a communication sequence comprising at least one data transmission between the selected ACP and the remote computer system;

generating and transmitting to the customer in accordance with the contact details at least one of a first collection code and a second collection code;

and at a time of collection providing access to the enclosure to allow collection of the package by the customer responsive to validating, at the ACP, the at least one of the first collection code and the second collection code, which was transmitted to the customer, and is received from the customer at the time of collection at the user interface;

said method including both first and second processes;

wherein if at the time of collection the communication sequence has not been completed, then in accordance with said first process, said access is provided to the enclosure to allow collection of the package responsive to receiving at least the first collection code but not the second collection code at the user interface, wherein the first collection code is generated at the remote computer system based on a remote data item, the remote data item being stored in the remote memory and corresponding to the local data item, and the first collection code is validated at the ACP by means of the local data item;

and if at the time of collection the communication sequence has been completed, then in accordance with said second process, said access is provided to the enclosure to allow collection of the package responsive to receiving at least the second collection code at the user interface, wherein the second collection code is not based on the remote data item, and an authorization code corresponding to the second collection code is stored in the local memory; and the second collection code is validated at the ACP by means of the authorization code.

2. A method according to claim 1, wherein if at the time of collection the communication sequence has been completed, access is not provided to the enclosure to allow collection of the package responsive to receiving a user input at the user interface, wherein said user input comprises the first collection code but not the second collection code.

3. A method according to claim 1, wherein the second collection code is a random or pseudorandom code.

4. A method according to claim 1, wherein the package is identified by a package identification code in or on the package, and at least one of the remote data item and the local data item is or corresponds to the package identification code.

5. A method according to claim 4, wherein the enclosure is unlocked to receive the package on delivery thereof when at least the package identification code is received at the user interface.

6. A method according to claim 1, wherein the at least one data transmission contains the second collection code or the authorization code or a related code from which the second collection code or the authorization code can be derived.

7. A method according to claim 1, wherein both of the first and second collection codes are transmitted to the customer as separate codes or in combination as a composite code.

8. A method according to claim 1, wherein only one of the first and second collection codes is transmitted to the customer.

9. A method according to claim 1, wherein the second collection code is generated at the ACP.

10. A method according to claim 1, wherein the second collection code is generated at the remote computer system.

11. A method according to claim 4, wherein the package identification code is scanned by a hand held device before the package is secured in the enclosure, and after the package is secured in the enclosure the package identification code is uploaded from the hand held device to the central computer system.

12. A method according to claim 1, wherein the at least one data link is provided by a hand held device carried by a person delivering the package, the hand held device being used to transfer data between the ACP and the remote computer system.

13. A package delivery apparatus comprising a network of automated collection points (ACPs) and a remote computer system, the remote computer system including a remote memory;

each ACP comprising at least one secure enclosure, a local computer having a local memory, and a local user interface in communication with the local computer, the local computer having at least one data link for communicating with the remote computer system, the local computer controlling access to the enclosure;

wherein the remote computer system is provided with details of a package for delivery to a customer via a selected one of the ACPs, and contact details of the customer are stored in the remote memory;

and the apparatus is arranged to secure the package on delivery to the selected one of the ACPs in a respective enclosure, and to store in the respective local memory a local data item relating to the package, and to initiate a communication sequence comprising at least one data transmission between the selected ACP and the remote computer system;

wherein the apparatus includes a first collection code generating means and a second collection code generating means;

and the first collection code generating means is arranged to generate at the remote computer system a first collection code based on a remote data item, the remote data item being stored in the remote memory and corresponding to the local data item;

and the second collection code generating means is arranged to generate a second collection code not based on the remote data item, and the apparatus is arranged to store an authorization code corresponding to the second collection code in the local memory;

and the apparatus is arranged to transmit to the customer in accordance with the contact details at least one of the first collection code and the second collection code;

and, at a time of collection, to provide access to the enclosure to allow collection of the package by the customer responsive to validating, at the ACP, said at least one of the first collection code and the second collection code, which was-transmitted to the customer, and is received from the customer at the time of collection at the user interface;

and the apparatus is arranged to perform both first and second processes;

wherein in accordance with the first process, the apparatus is arranged to provide access to the enclosure to allow collection of the package responsive to receiving at least the first collection code but not the second collection code at the user interface, and to validate the first collection code at the ACP by means of the local data item, if at the time of collection the communication sequence has not been completed;

and in accordance with the second process, the apparatus is arranged to provide access to the enclosure to allow collection of the package responsive to receiving at least the second collection code at the user interface, and to validate the second collection code at the ACP by means of the authorization code, if at the time of collection the communication sequence has been completed.

14. A package delivery apparatus according to claim 13, wherein the apparatus is arranged not to provide access to the enclosure to allow collection of the package responsive to receiving a user input at the user interface, wherein said user input comprises the first collection code, but not the second collection code, if at the time of collection the communication sequence has been completed.

15. A package delivery apparatus according to claim 13, wherein the second collection code is a random or pseudo-random code.

16. A package delivery apparatus according to claim 13, wherein the package is identified by a package identification code in or on the package, and at least one of the remote data item and the local data item is or corresponds to the package identification code.

17. A package delivery apparatus according to claim 16, wherein the local computer is arranged to unlock the enclosure to receive the package on delivery thereof when at least the package identification code is received at the user interface.

18. A package delivery apparatus according to claim 13, wherein the at least one data transmission contains the second collection code or the authorization code or a related code from which the second collection code or the authorization code can be derived.

19. A package delivery apparatus according to claim 13, wherein the apparatus is arranged to transmit both of the first and second collection codes to the customer as separate codes or in combination as a composite code.

20. A package delivery apparatus according to claim 13, wherein the apparatus is arranged to transmit only one of the first and second collection codes to the customer.

21. A package delivery apparatus according to claim 13, wherein the second collection code is generated at the ACP.

22. A package delivery apparatus according to claim 13, wherein the second collection code is generated at the remote computer system.

23. A package delivery apparatus according to claim 16, wherein a hand held device is arranged to scan the package identification code before the package is secured in the enclosure, and to upload the package identification code from the hand held device to the central computer system after the package is secured in the enclosure.

24. A package delivery apparatus according to claim 13, wherein the at least one data link is provided by a hand held device carried by a person delivering the package, the hand held device being arranged to transfer data between the ACP and the remote computer system.

* * * * *